United States Patent [19]
Nies

[11] Patent Number: 5,328,178
[45] Date of Patent: Jul. 12, 1994

[54] BRAKE MASTER CYLINDER SEAL
[75] Inventor: David L. Nies, Beavercreek, Ohio
[73] Assignee: General Motors Corporation, Detroit, Mich.
[21] Appl. No.: 960,643
[22] Filed: Oct. 14, 1992
[51] Int. Cl.[5] .............................................. F16J 15/32
[52] U.S. Cl. ...................................... 277/205; 277/29; 277/152; 277/215
[58] Field of Search ....................... 277/29, 205, 212 R, 277/212 C, 215, 70, 152

[56] References Cited

U.S. PATENT DOCUMENTS

| | | | |
|---|---|---|---|
| 2,196,337 | 4/1940 | Loweke | 277/215 |
| 2,757,947 | 8/1956 | Whitten | 277/205 |
| 3,214,182 | 10/1965 | Herbruggen | 277/215 |
| 3,232,628 | 2/1966 | Brand | 277/215 |
| 3,601,419 | 8/1971 | Fern | 277/205 |
| 3,829,104 | 8/1974 | Green | 277/29 |
| 4,061,346 | 12/1977 | Coleman et al. | 277/205 |
| 5,127,661 | 7/1992 | Franson et al. | 277/205 |

FOREIGN PATENT DOCUMENTS

3605465A1  8/1987  Fed. Rep. of Germany .

Primary Examiner—William A. Cuchlinski, Jr.
Assistant Examiner—Daniel G. DePumpo
Attorney, Agent, or Firm—Ernest E. Helms

[57] ABSTRACT

A ring seal for sealing a piston of a master cylinder is provided. The ring seal is fitted within a generally rectangular groove of the piston, the groove having front and rear walls joined by a floor. The ring seal prevents fluid communication from a first chamber to a second chamber during high pressure differentials and allows fluid communication from the second chamber to the first chamber under very low pressure differentials.

1 Claim, 2 Drawing Sheets

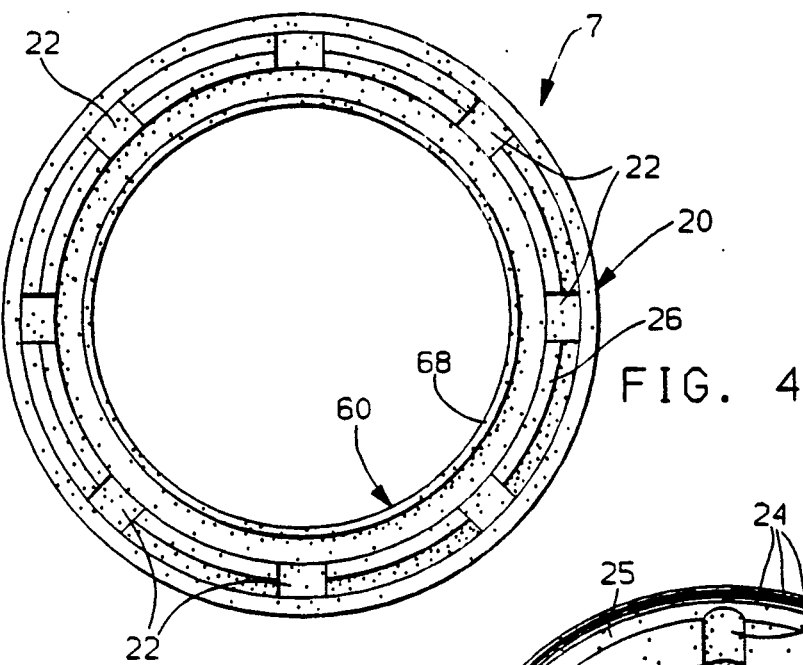
FIG. 4
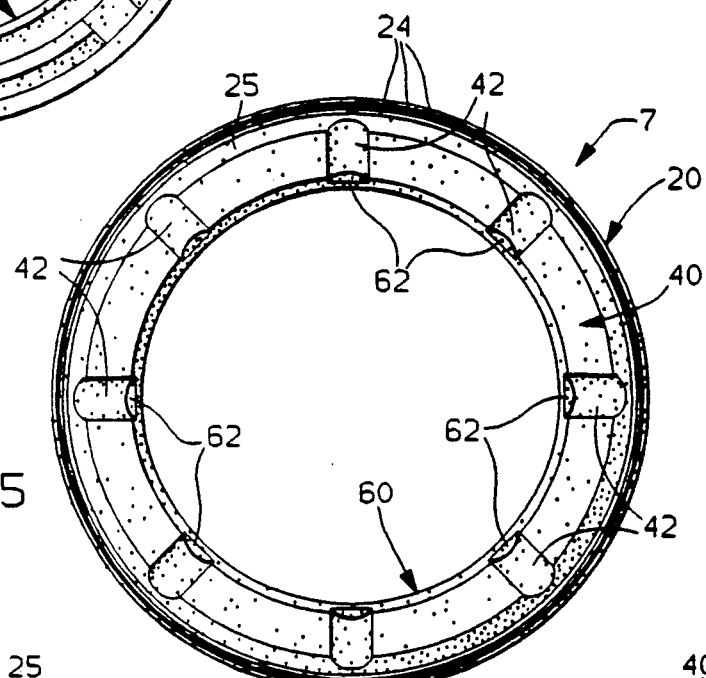
FIG. 5
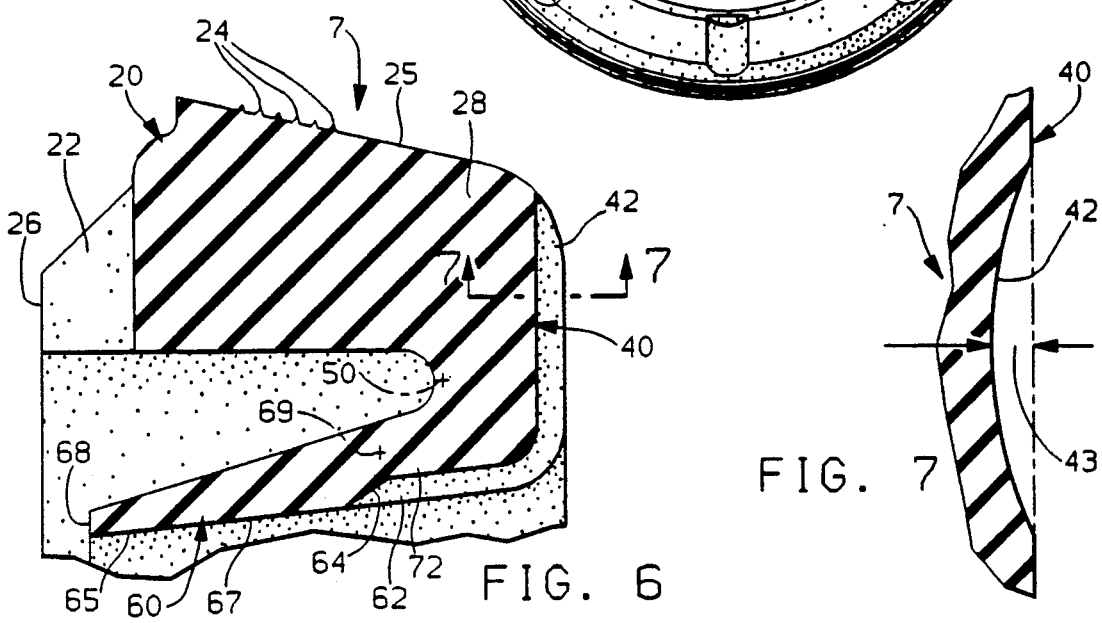
FIG. 6
FIG. 7

BRAKE MASTER CYLINDER SEAL

FIELD OF THE INVENTION

The field of the present invention is that of O-ring type seals for master cylinder pistons and more specifically V-block type seals which seal the master cylinder piston in one direction and allow fluid flow past the seal in the opposite direction under low pressure differential conditions.

DISCLOSURE STATEMENT

Typical master cylinders in automotive vehicles for many years have been of the dual or tandem type; that is, they have two pressurizing chambers in a common bore having a closed end and an open end, with brake fluid being pressurized by a primary piston and a secondary piston arranged in tandem in the bore. One of the chambers is typically connected to one brake circuit such as one containing the vehicle front brakes, and the other chamber is typically connected to another brake circuit containing the vehicle rear brakes.

Such a master cylinder usually has a pair of holes in the main bore adjacent each of the primary and secondary piston seals. The holes are connected to the master cylinder reservoir and extend to the bore. One of the holes is a compensating port (typically the larger of the holes) located behind the seal of the associated piston. The other hole is a bypass hole positioned in front of the seal of the associated piston.

When the master cylinder is actuated, the seals move across their respective bypass holes so that these holes are no longer fluidly connected with the pressurizing chambers, and brake fluid in these chambers and the brake circuits connected with them can then be pressurized to actuate the brakes. The seals are usually cup-like or V-block seals which have an outer and lower lip and typically fit within a groove of the piston.

The seal must seal the chambers within the master cylinders for very high pressures extending beyond 3000 psi when pressurizing the vehicle brakes. However, the seals also allow fluid flow from an area rearward of the seals when the vehicle brakes are released to allow compensating flow to enter the chambers to allow fluid make-up which occurs during prolonged wear of the brakes wherein the wheel cylinders or brake calipers extend outward to a greater extent, therefore requiring additional fluid to be added to the chambers which are fluidly connected with the fluid brakes.

When the master cylinder is in the non-actuated or rest position, at least one of the piston seals will be located between the bypass and compensation holes, the bypass hole being forward of the seal. The bypass hole in the piston rest position is adequate to allow for the influx or outward flow of brake fluid from the chambers due to the expansion or contraction of the brake fluid.

In many traction control (TC) systems which are combined with antilock braking systems (ABS), there is a system hydraulic pump which, when needed, withdraws fluid from the braking system, thereby taking fluid away from the master cylinder pressurizing chambers. (Note: The above occurs in TC when the piston is at a rest position.) When the above occurs, there must be some method to allow rapid and responsive compensation of the fluid in order to allow a minimum of restricted flow to the pump and to prevent the forming of vacuums or pockets within the pressurizing chamber since the bypass hole does not have enough capacity to allow the needed amount of fluid influx into the pressurizing chamber. Prior V-block seals were deficient in allowing adequate amounts of fluid flow under the low vacuum conditions caused by actuation of a traction control or ABS pump.

At first it would seem that the solution to this problem was fairly simple by making the outer lip thinner and therefore more responsive to such low pressure differentials, but this is found to be undesirable due to two factors. First, thinner outer lips allow the outer lip to be more pliable and therefore subject to greater opportunities to be nipped when passing over the bypass hole during the normal brake actuation and also the compensation hole during assembly operation. Additionally, causing the outer lip to be thinner would make it less desirable from a wear standpoint.

SUMMARY OF THE INVENTION

To overcome the above-noted problems and to provide a ring seal allowing fluid communication from the compensation port of a master cylinder into the pressurized chamber under low vacuum conditions while minimizing wear upon the seal to be as strong as possible, the present invention is brought forth. The present invention provides an improved V-block type seal allowing flow from the compensation port to the brake chamber under low pressure differential conditions by allowing and promoting fluid flow underneath the inner lip.

BRIEF DESCRIPTION OF THE DRAWINGS

FIGS. 4 and 5 are views taken along lines 4—4 and 5—5, respectively, of FIG. 3;

FIG. 6 is an enlarged sectional view of the seal ring shown; and

FIG. 7 is a view taken along line 7—7 of FIG. 6.

DETAILED DESCRIPTION OF THE INVENTION

Figure 1:
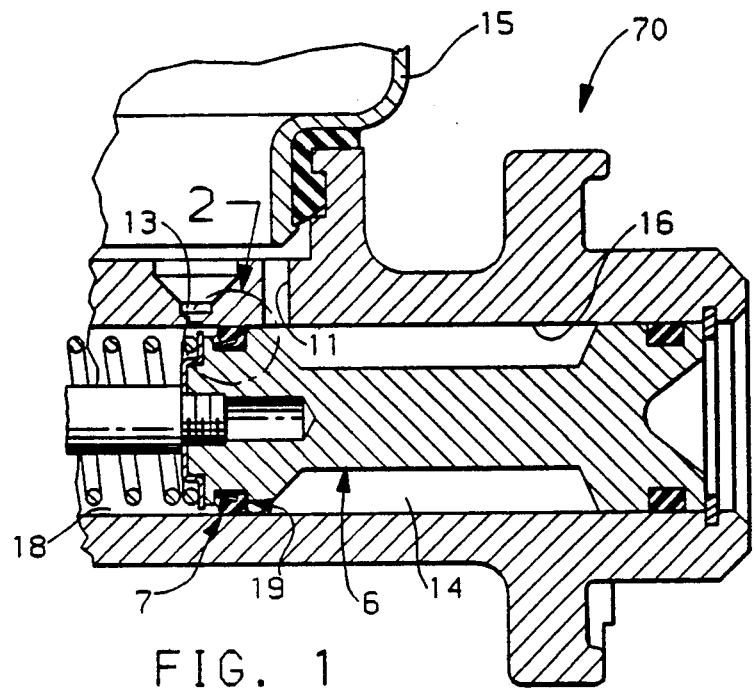
FIG. 1 is a view of a preferred embodiment of the present invention shown installed within the groove of a master cylinder piston.
Figure 2:
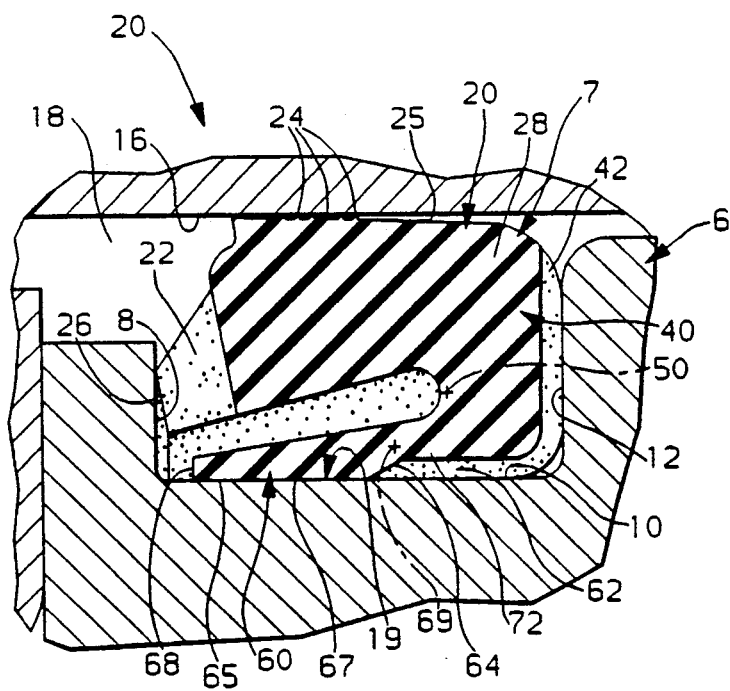
FIG. 2 is an enlargement of an encircled portion of FIG. 1.
Figure 3:
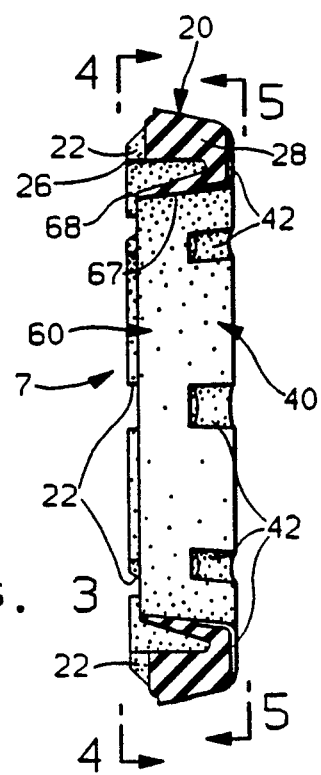
FIG. 3 is a sectional view of the seal ring shown before installation.

Referring to FIGS. 1 and 2, a master cylinder 70 has a bore 16, and inserted there are a movable primary piston 6 and a secondary piston (not shown). The bore 16 has an intersecting compensating port 11 and bypass hole 13. Slidably mounted in the bore 16 is a piston 6. The piston 6 has an annular rectangular groove 19 which has front and rear ends 8 and 12, respectively, joined by a floor 10. Inserted within the groove 19 will be the present inventive seal ring 7, which divides the bore 16 into a first pressurization chamber 18 which is fluidly connected with the wheel brakes (not shown) and a second pressurization chamber 14 which is fluidly connected with a reservoir 15 via the compensation port 11.

Referring additionally to FIGS. 3 through 7, the seal ring 7 has an outer annular lip 20. Outer annular lip 20 has a front end 26 and a rear end 28. The front end 26 extends toward the first chamber 18. On top of the outer lip there is a series of lubrication grooves 24 which retain small amounts of fluid in order to lubricate the seal 7 as it passes through the bore 16.

The outer lip 20 is thick for two reasons. The first reason is that the thicker the lip 20 is, being an annular member, the less responsive it is to pressure forces and the more it will act like a single lever member and will be deformed less by the pressures to which it is exposed. Additionally, the outer lip 20 is thickened to allow for wear since the outer lip must pass over the bypass hole 13 during operation and the compensation port 11 during assembly. The outer lip 20 has a series of slots 22 along its forward end so that fluid may communicate between both sides (inner and outer) of the outer lip 20 when the first end 26 is adjacent the forward wall 8 of the groove.

Integrally joined with the outer lip is a mid-body portion 40. Mid-body portion 40 has a series of geometrically spaced formed flow paths 42 whose function will be described later.

Also integrally joined to the mid-body portion is a thin inner lip 60. The inner lip has a front end 68 and a rear end 72. The inner lip also has a formed flow path 62 which is aligned with the flow path 42 of the mid-body portion. The flow path 62 terminates at a point 64 forward of where the outer and inner lips join with the mid-body portion 40. Additionally, inner lip front end 68 will have a slightly smaller diameter than the rear end 72, which is typically with most V-block type seals. The inner surface 67 of the inner lip toward the front end 68 will have a slight interference fit with the floor 10 of the groove. The inner lip 60 is also shorter than the outer lip 20 to insure that the front end 68 of the inner lip cannot sealably contact the front wall 8 of the groove.

Upon installation, the outer lip will be bent inward slightly (FIGS. 1 and 2) so that its top surface 25 is almost parallel with the master cylinder bore 16. When being pushed forward, the seal 7 will typically be pushed to a position wherein the mid-body portion will be adjacent with the rear wall 12. Sealing will occur by the outer sealing lip 20 being forced against the bore 16, and the lower lip 60 inner surface 67 will be forced against the floor 10 of the groove.

In situations where there is a vacuum created by an ABS or traction control pump (not shown) in chamber 18, fluid will be allowed to flow from the compensation port along fluid flow path 42 to fluid flow path 62. Even at very slight pressure differentials, portion 65 of the inner lip (which extends from the front end 68 to the terminus 64 of the flow path 62) will act as a flapper, flapping up and allowing flow underneath it and then past the slots 22 of the outer lip. By utilizing the above inventive design, applicant has noted a two- to three-fold increase of flow over prior V-block seals which has been achieved under very low pressures, typically one-half atmosphere.

The terminus 64 of the lower lip flow path causes the lower lip portion 65 to act as a flapper and is responsive to very low pressures. The center of bending of lip portion 65 is at 69. The center of bending of the upper lip 20 with respect to the lower lip is at approximately a point 50 (substantially rearward of point 69) in the mid-body portion and is far less responsive to pressure differentials.

Referring to FIG. 7, the fluid path 42 has a low height dimension 43 to insure that the seal 7 does not move axially in relation to the bore by virtue of compression. The above feature is to prevent additional dead travel by the piston 6 before the first chamber is pressurized after the seal 7 passes past the bypass hole 13.

Accordingly, while this invention has been described in terms of a specific embodiment thereof, it will be appreciated that other forms could readily be adapted, and therefore the scope of this invention is to be considered limited only by the following claims.

The embodiments of the invention in which an exclusive property or privilege is claimed are defined as follows:

1. A ring seal for sealing a movable master cylinder piston in a bore of a master cylinder housing, the ring seal dividing the bore into first and second chambers, the ring seal being fitted within a generally rectangular groove of the piston, the groove having front and rear walls joined by a floor, the ring seal preventing fluid communication from the first chamber to the second chamber up to and including high pressure differentials and allowing fluid communication from the second chamber to the first chamber under very low pressure differentials, the seal comprising:

a thick radially outer annular lip for sealing engagement with the master cylinder bore having a front end and a rear end, the front end extending toward the first chamber, the radially outer annular lip having a series of transverse slots along its front end to allow fluid communication between inner and outer sides of the radially outer annular lip when the radially outer annular lip is contacting the front wall of the groove;

a mid-body portion integrally joined to the radially outer annular lip rear end extending generally parallel with the piston groove rear wall having a series of flow paths along its side adjacent the rear groove wall; and a thin radially inner annular lip with front and rear ends, the rear end being integrally joined with the mid-body portion and the radially inner annular lip having a series of flow paths aligned with the flow paths of the mid-body portion terminating at a position forward of the mid-body portion along the radially inner annular lip's inner surface which is adjacent to the groove floor, and the radially inner annular lip having a length shorter than that of the radially outer annular lip with the front end spaced away from the front groove wall, the radially inner annular lip front end having a diameter smaller than the radially inner annular lip rear end with an interference fit with the groove floor, the radially inner annular lip having a center of bending with the mid-body forward of a center of bending of the radially outer annular lip with the mid-body and the radially inner annular lip being far more responsive to pressure differentials between the first and second pressure chamber than the radially outer annular lip.

* * * * *